US006434930B1

(12) United States Patent
Cullen et al.

(10) Patent No.: US 6,434,930 B1
(45) Date of Patent: Aug. 20, 2002

(54) METHOD AND APPARATUS FOR CONTROLLING LEAN OPERATION OF AN INTERNAL COMBUSTION ENGINE

(75) Inventors: Michael John Cullen, Northville; David Karl Bidner, Livonia; Gopichandra Surnilla, West Bloomfield; Jeffrey Scott Hepburn, Birmingham; Jerry D. Robichaux, Riverview, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/528,045

(22) Filed: Mar. 17, 2000

(51) Int. Cl.$^7$ ................................................. F01N 3/00
(52) U.S. Cl. ............................ 60/285; 60/274; 60/277; 60/301
(58) Field of Search ......................... 60/274, 277, 285, 60/276, 299, 301

(56) References Cited

U.S. PATENT DOCUMENTS

| 3,696,618 A | 10/1972 | Boyd et al. |
| 3,969,932 A | 7/1976 | Rieger et al. |
| 4,033,122 A | 7/1977 | Masaki et al. |
| 4,036,014 A | 7/1977 | Ariga |

(List continued on next page.)

FOREIGN PATENT DOCUMENTS

| DE | 196 07 151 C1 | 7/1997 |
| EP | 0 351 197 A2 | 1/1990 |
| EP | 0 351 197 A1 | 1/1990 |
| EP | 0 444 783 A1 | 9/1991 |

(List continued on next page.)

OTHER PUBLICATIONS

"An Air/Fuel Algorithm To Improve The NOx Conversion of Copper–Based Catalysts", by Joe Theis et al, SAE Technical Paper No. 922251, Oct. 19–22, 1992, pp. 77–89.

"Effect of Air–Fuel Ratio Modulation on Conversion Efficiency of Three–Way Catalysts", By Y. Kaneko et al., Inter–Industry Emission Control Program 2 (IIEC–2) Progress Report No. 4, SAE Technical Paper No. 780607, Jun. 5–9, 1978, pp. 119–127.

"Engineered Control Strategies For Improved Catalytic Control of NOx in Lean Burn Applications", by Alan F. Diwell, SAE Technical Paper No. 881595, 1988, pp. 1–11.

(List continued on next page.)

*Primary Examiner*—Thomas Denion
*Assistant Examiner*—Diem Tran
(74) *Attorney, Agent, or Firm*—Allan J. Lippa; John D. Russell

(57) ABSTRACT

A method and system for controlling the operation of "lean-burn" internal combustion engines determines a current rate of vehicle $NO_x$ emissions, and determines a threshold value for permissible vehicle $NO_x$ emissions based on at least one current value for the intake air-fuel ratio, engine speed, engine load (e.g., brake torque, manifold air pressure, or throttle position), and/or vehicle speed. A differential $NO_x$ emissions rate is calculated as the difference between the current rate and the threshold rate, and the differential rate is accumulated over time to obtain a differential measure representing the amount by which cumulative $NO_x$ emissions have fallen below permissible levels therefor. Lean engine operation is disabled when the differential $NO_x$ emissions measure exceeds a predetermined excess vehicle $NO_x$ emission value. In this manner, vehicle $NO_x$ emissions are favorably controlled even when the engine is operated "off-cycle," i.e., under operating conditions falling outside of the FTP driving cycles.

28 Claims, 3 Drawing Sheets

U.S. PATENT DOCUMENTS

| | | |
|---|---|---|
| 4,178,883 A | 12/1979 | Herth |
| 4,251,989 A | 2/1981 | Norimatsu et al. |
| 4,622,809 A | 11/1986 | Abthoff et al. |
| 4,854,123 A | 8/1989 | Inoue et al. |
| 4,884,066 A | 11/1989 | Miyata et al. |
| 4,913,122 A | 4/1990 | Uchida et al. |
| 4,964,272 A | 10/1990 | Kayanuma |
| 5,009,210 A | 4/1991 | Nakagawa et al. |
| 5,088,281 A | 2/1992 | Izutani et al. |
| 5,097,700 A | 3/1992 | Nakane |
| 5,165,230 A | 11/1992 | Kayanuma et al. |
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |
| 5,272,871 A | 12/1993 | Oshima et al. |
| 5,325,664 A | 7/1994 | Seki et al. |
| 5,331,809 A | 7/1994 | Takeshima et al. |
| 5,335,538 A | 8/1994 | Blischke et al. |
| 5,357,750 A | 10/1994 | Ito et al. |
| 5,377,484 A | 1/1995 | Shimizu |
| 5,402,641 A | 4/1995 | Katoh et al. |
| 5,410,873 A | 5/1995 | Tashiro |
| 5,412,945 A | 5/1995 | Katoh et al. |
| 5,412,946 A | 5/1995 | Oshima et al. |
| 5,414,994 A | 5/1995 | Cullen et al. |
| 5,419,122 A | 5/1995 | Tabe et al. |
| 5,423,181 A | 6/1995 | Katoh et al. |
| 5,433,074 A | 7/1995 | Seto et al. |
| 5,437,153 A | 8/1995 | Takeshima et al. |
| 5,448,887 A | 9/1995 | Takeshima |
| 5,450,722 A | 9/1995 | Takeshima et al. |
| 5,452,576 A | 9/1995 | Hamburg et al. |
| 5,472,673 A | 12/1995 | Goto et al. |
| 5,473,887 A | 12/1995 | Takeshima et al. |
| 5,473,890 A | 12/1995 | Takeshima et al. |
| 5,483,795 A | 1/1996 | Katoh et al. |
| 5,544,482 A | 8/1996 | Matsumoto et al. |
| 5,551,231 A | 9/1996 | Tanaka et al. |
| 5,577,382 A | 11/1996 | Kihara et al. |
| 5,595,060 A | 1/1997 | Togai et al. |
| 5,598,703 A | 2/1997 | Hamburg et al. |
| 5,622,047 A | 4/1997 | Yamashita et al. |
| 5,626,014 A | 5/1997 | Hepburn et al. |
| 5,626,117 A | 5/1997 | Wright et al. |
| 5,655,363 A | 8/1997 | Ito et al. |
| 5,657,625 A | 8/1997 | Koga et al. |
| 5,693,877 A | 12/1997 | Ohsuga et al. |
| 5,713,199 A | 2/1998 | Takeshima et al. |
| 5,715,679 A | 2/1998 | Asanuma et al. |
| 5,722,236 A | 3/1998 | Cullen et al. |
| 5,724,808 A | 3/1998 | Ito et al. |
| 5,732,554 A | 3/1998 | Sasaki et al. |
| 5,735,119 A | 4/1998 | Asanuma et al. |
| 5,740,669 A | 4/1998 | Kinugasa et al. |
| 5,743,084 A | 4/1998 | Hepburn |
| 5,746,049 A | 5/1998 | Cullen et al. |
| 5,746,052 A | 5/1998 | Kinugasa et al. |
| 5,752,492 A | 5/1998 | Kato et al. |
| 5,771,685 A | 6/1998 | Hepburn |
| 5,771,686 A * | 6/1998 | Pischinger et al. ........... 60/285 |
| 5,778,666 A | 7/1998 | Cullen et al. |
| 5,792,436 A | 8/1998 | Feeley et al. |
| 5,802,843 A | 9/1998 | Kurihara et al. |
| 5,803,048 A | 9/1998 | Yano et al. |
| 5,832,722 A | 11/1998 | Cullen et al. |
| 5,842,340 A | 12/1998 | Bush et al. |
| 5,865,027 A | 2/1999 | Hanafusa et al. |
| 5,934,072 A * | 8/1999 | Hirota et al. ................. 60/301 |
| 5,938,715 A | 8/1999 | Zang et al. |
| 5,970,707 A | 10/1999 | Sawada et al. |
| 5,974,788 A | 11/1999 | Hepburn et al. |
| 5,974,791 A | 11/1999 | Hirota et al. |
| 5,974,793 A | 11/1999 | Kinagusa et al. |
| 5,983,627 A | 11/1999 | Asik |
| 5,992,142 A | 11/1999 | Pott |
| 5,996,338 A | 12/1999 | Hirota |
| 6,012,428 A | 1/2000 | Yano et al. |
| 6,014,859 A | 1/2000 | Yoshizaki et al. |
| 6,023,929 A | 2/2000 | Ma |
| 6,058,700 A | 5/2000 | Yamashita et al. |
| 6,012,282 A * | 8/2000 | Kato et al. ..................... 60/277 |
| 6,109,024 A * | 8/2000 | Kinugasa et al. ............. 60/286 |
| 6,148,612 A * | 11/2000 | Yamashita et al. ............ 60/277 |
| 6,161,378 A * | 12/2000 | Hanaoka et al. .............. 60/285 |
| 6,195,987 B1 * | 3/2001 | Miyashita ..................... 60/285 |

FOREIGN PATENT DOCUMENTS

| | | |
|---|---|---|
| EP | 0 503 882 A1 | 9/1992 |
| EP | 0 580 389 A1 | 1/1994 |
| JP | 62-97630 | 5/1987 |
| JP | 62-117620 | 5/1987 |
| JP | 64-53042 | 3/1989 |
| JP | 2-30915 | 2/1990 |
| JP | 2-33408 | 2/1990 |
| JP | 2-207159 | 8/1990 |
| JP | 3-155147 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| WO | WO 98/27322 | 6/1998 |

OTHER PUBLICATIONS

Allen H. Meitzler, "Application of Exhaust–Gas–Oxygen Sensors to the Study of Storage Effects in Automotive Three–Way Catalysts", SAE 800019, Feb. 25–29, 1980.

Toshiaki Yamamoto, et al., "Dynamic Behavior Analysis of Three Way Catalytic Reaction", JSAE 882072—882166.

W.H. Holl, "Air Fuel Control to Reduce Emissions I. Engine–Emissions Relationships", SAE 800051, Feb. 25–29, 1980.

Wei–Ming Wang, "Air–Fuel Control to Reduce Emissions, II. Engine–Catalyst Characterization Under Cyclic Conditions", SAE 800052, Feb. 25–29, 1980.

Christopher D. De Boer et al., "Engineered Control Strategies for Improved Catalytic Control of $NO_x$ in Lean Burn Applications", SAE 881595, Oct. 10–13, 1988.

* cited by examiner

METHOD AND APPARATUS FOR CONTROLLING LEAN OPERATION OF AN INTERNAL COMBUSTION ENGINE

BACKGROUND OF THE INVENTION

1. Field of the Invention

The invention relates to methods and systems for controlling the operation of "lean-burn" internal combustion engines used in motor vehicles to obtain improvements in vehicle fuel economy.

2. Background Art

The exhaust gas generated by a typical internal combustion engine, as may be found in motor vehicles, includes a variety of constituent gases, including hydrocarbons (HC), carbon monoxide (CO), nitrogen oxides ($NO_x$) and oxygen ($O_2$). The respective rates at which an engine generates these constituent gases are typically dependent upon a variety of factors, including such operating parameters as air-fuel ratio (8), engine speed and load, engine temperature, ambient humidity, ignition timing ("spark"), and percentage exhaust gas recirculation ("EGR"). The prior art often maps values for instantaneous engine-generated or "feedgas" constituents, such as $NO_x$, based, for example, on detected values for instantaneous engine speed and engine load.

To limit the amount of engine-generated constituent gases, such as HC, CO and NOx, that are exhausted through the vehicle's tailpipe to the atmosphere as "emissions," motor vehicles typically include an exhaust purification system having an upstream and a downstream three-way catalyst. The downstream three-way catalyst is often referred to as a $NO_x$ "trap". Both the upstream and downstream catalyst store NOx when the exhaust gases are "lean" of stoichiometry and release previously stored $NO_x$ for reduction to harmless gases when the exhaust gases are "rich" of stoichiometry.

Under one prior art approach, the duration of any given lean operating excursion (or its functional equivalent, the frequency or timing of each purge event) is controlled based upon an estimate of how much $NO_x$ has accumulated in the trap since the excursion began. Specifically, a controller accumulates estimates of feedgas $NO_x$ over time to obtain a measure representing total generated $NO_x$. The controller discontinues the lean operating excursion when the total generated $NO_x$ measure exceeds a predetermined threshold representing the trap's nominal $NO_x$-storage capacity. In this manner, the prior art seeks to discontinue lean operation, with its attendant increase in engine-generated $NO_x$, before the trap is fully saturated with $NO_x$, because engine-generated $NO_x$ would thereafter pass through the trap and effect an increase in tailpipe $NO_x$ emissions.

Unfortunately, empirical evidence suggests that the instantaneous storage efficiency of the trap, i.e., the trap's instantaneous ability to absorb all of the $NO_x$ being generated by the engine, rarely approaches 100 percent. Indeed, as the trap begins to fill, the instantaneous storage efficiency of the trap appears to decline significantly, with an attendant increase in the amount of $NO_x$ being exhausted to the atmosphere through the vehicle's tailpipe. While increasing the frequency of the purge events may serve to maintain relatively higher trap storage efficiencies, the fuel penalty associated with the purge event's enriched air-fuel mixture and, particularly, the fuel penalty associated with an initial release of oxygen stored previously stored in the three-way catalyst during lean engine operation, would rapidly negate the fuel savings associated with lean engine operation.

Moreover, under certain engine operating conditions, for example, under high engine speed and high engine load, the $NO_x$ generation rate and correlative exhaust flow rate through the trap are both so high that the trap does not have an opportunity to store all of the $NO_x$ in the exhaust, even assuming a 100 percent trap storage efficiency. As a result, such operating conditions are themselves typically characterized by a significant increase in tailpipe $NO_x$ emissions, notwithstanding the use of the $NO_x$ trap.

For a majority of motor vehicles, the effectiveness of a given method and system for controlling tailpipe $NO_x$ emissions is generally measured by evaluating the vehicle's performance in a standardized test under the Federal Test Procedure (FTP), in which the vehicle is operated in a prescribed manner to simulate a variety of engine operating conditions, at a variety of different engine-speed and engine-load combinations. A graphical illustration of the various engine speed/load combinations achieved during the FTP City Driving Cycle is depicted as Region I in FIG. 5, while the various engine-speed and engine-load combinations achieved during the FTP Highway Driving Cycle are depicted in FIG. 5.

During either FTP test, vehicle $NO_x$ emissions, as measured by a $NO_x$ sensor, are accumulated over the course of a thirty-minute test period. The vehicle is deemed to have passed the test if the accumulated value of tailpipe $NO_x$, in grams, does not exceed a prescribed threshold amount. Often, the prescribed threshold amount of permissible $NO_x$ emissions under the Highway Driving Cycle is characterized as a multiple of the prescribed threshold amount for the City Driving Cycle.

The $NO_x$ emissions of certain other motor vehicles, such as heavy trucks, are measured using another approach, wherein the vehicle's engine is independently certified on a dynamometer, with the engine's instantaneous NOx emissions thereafter being normalized by the engine's peak horsepower, in grams per horsepower-hour. In either event, such emissions standards are said to be "scalar," i.e., fixed or static, rather than dynamic.

Significantly, it has been observed that, while the FTP City and Highway Driving Cycles include the vast majority of operating conditions over which a given motor vehicle is likely to be operated, the Cycles themselves are not necessarily representative of the manner in which most vehicles are operated. For example, it is generally true that an engine generates increased $NO_x$ emissions under operating conditions characterized by increased engine speeds and increased engine loads. Thus, each FTP cycle necessarily permits its relatively lower $NO_x$-generating operating conditions to offset its relatively higher $NO_x$-generating operating conditions, with a vehicle "passing the test" so long as the average generated $NO_x$ does not rise to the level at which the total generated $NO_x$ exceeds the prescribed threshold after thirty minutes.

In contrast, in "real world" operation, a given engine operating condition, such as a "highway cruise" operating condition characterized by substantially-higher instantaneous rates of NOx generation, may continue unabated for substantial periods of time. Such continued operation of the engine, even at an engine speed/load falling within Region I or Region II of FIG. 5, is properly characterized as being "off-cycle." Similarly, certain circumstances, such as the towing of a large trailer, or operation of the vehicle at relatively higher altitudes, may push the operating point of the engine fully outside of Regions I and II. Engine operation under these circumstances (with engine speed/loads falling in the area generally depicted as Region III in FIG. 5) are likewise properly characterized as being "off-cycle."

And, because off-cycle operation may constitute a substantial portion of any given driving session, the FTP cycles do not necessarily predict the likely real-world emissions of a given vehicle.

Therefore, a need exists for a method and system for controlling the operation of a "lean-burn" internal combustion engine which seeks to regulate all vehicle $NO_x$ emissions, including "off-cycle" $NO_x$ emissions.

SUMMARY OF THE INVENTION

In accordance with the invention, a method is provided for controlling the operation of an internal combustion engine in a motor vehicle, wherein the engine generates exhaust gas including $NO_x$, and wherein exhaust gas is directed through an exhaust gas purification system including a $NO_x$ trap before being exhausted to the atmosphere. Under the invention, the method includes determining a current rate at which $NO_x$ is being exhausted to the atmosphere; determining a threshold rate for maximum permissible $NO_x$ emissions as a function of at least one of the group consisting of an engine speed, a vehicle speed, an engine brake torque, an engine manifold air pressure, and a throttle position; and determining a differential rate based on the current rate and the threshold rate. The method further includes selecting a restricted range of engine operating conditions based on the differential rate, wherein the restricted range of engine operating conditions is characterized by a plurality of air-fuel ratios, each of the plurality of air-fuel ratios being not leaner than a near-stoichiometric air-fuel ratio. By way of example, in an exemplary embodiment, the restricted range of engine operating conditions is selected when an accumulated measure based on the differential rate exceeds a near-zero threshold value.

In accordance with a feature of the invention, determining the current rate is achieved either by sampling the output signal generated by a $NO_x$ sensor positioned downstream of the $NO_x$ trap or, alternatively, calculating the current rate by determining a generation rate representative of the $NO_x$ content of the exhaust being instantaneously generated by the engine, determining a storage rate representative of an instantaneous rate at which $NO_x$ is being stored by the trap, and subtracting the storage rate from the generation rate.

In accordance with another feature of the invention, an exemplary method for practicing the invention further includes calculating a cumulative amount of $NO_x$ stored in the trap using the current rate; and selecting the first region of engine operating conditions when the cumulative amount exceeds a trap capacity value. Preferably, the method further includes determining the trap capacity value as a function of at least one of the group consisting of a trap temperature, a trap sulfation level, and an air-fuel ratio.

Other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
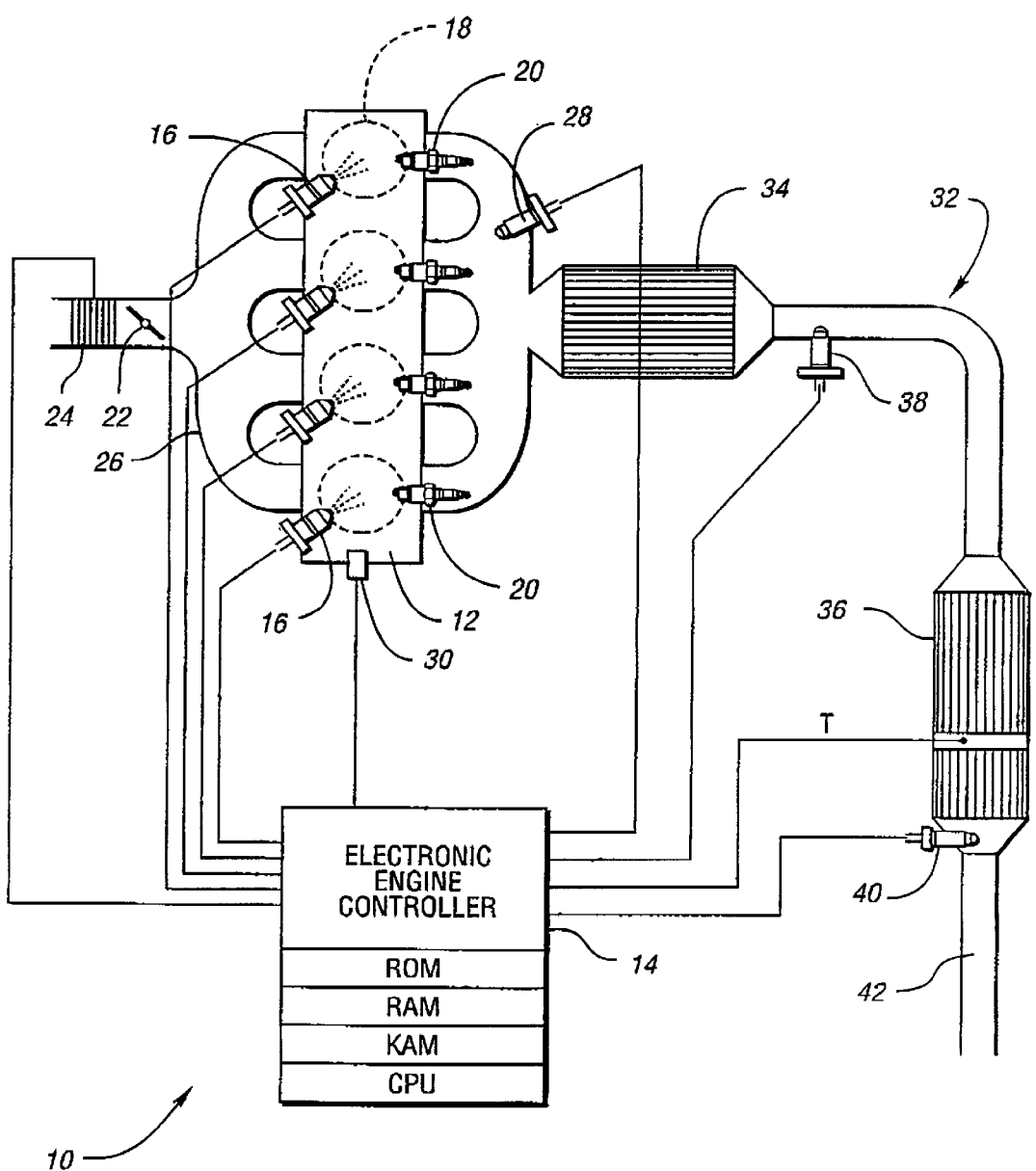
FIG. 1 is a schematic of an exemplary system for practicing the invention.

Referring to FIG. 1, an exemplary control system 10 for a four-cylinder gasoline-powered engine 12 for a motor vehicle includes an electronic engine controller 14 having ROM, RAM and a processor ("CPU") as indicated. The controller 14 controls the operation of each of a set of fuel injectors 16. The fuel injectors 16, which are of conventional design, are each positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake of engine's intake manifold 26, provides a signal regarding the air mass flow resulting from positioning of the engine's throttle 22. The air flow signal from the air mass flow sensor 24 is utilized by the controller 14 to calculate an air mass value AM which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio (1=1.00). A plurality of other sensors, including an engine speed sensor and an engine load sensor, indicated generally at 30, also generate additional signals in a known manner for use by the controller 14. It will be understood that the engine load sensor 30 can be of any suitable configuration, including, by way of example only, an intake manifold pressure sensor, an intake air mass sensor, or a throttle position/angle sensor.

An exhaust system 32 receives the exhaust gas generated upon combustion of the air-fuel mixture in each cylinder 18. The exhaust system 32 includes an upstream three-way catalytic converter ("three-way catalyst 34") and a downstream $NO_x$ trap 36. The three-way catalyst 34 contains a catalyst material that chemically alters the exhaust gas in a known manner. The trap 36 alternately stores and releases amounts of engine-generated $NO_x$, based upon such factors as intake air-fuel ratio, trap temperature T (as determined by trap temperature sensor 38), percentage exhaust gas recirculation, barometric pressure, humidity, instantaneous trap "fullness," instantaneous sulfur poisoning, and trap aging effects (due, for example, to permanent thermal aging, or to the "deep" diffusion of sulfur into the core of the trap material which cannot subsequently be purged). A $NO_x$ sensor 40 of any suitable configuration is positioned downstream of the trap 36. The $NO_x$ sensor 40 generates a control signal representative of the instantaneous $NO_x$ content of the exhaust gas exiting the tailpipe 42 and exhausted to the atmosphere during engine operation.

Figure 2:
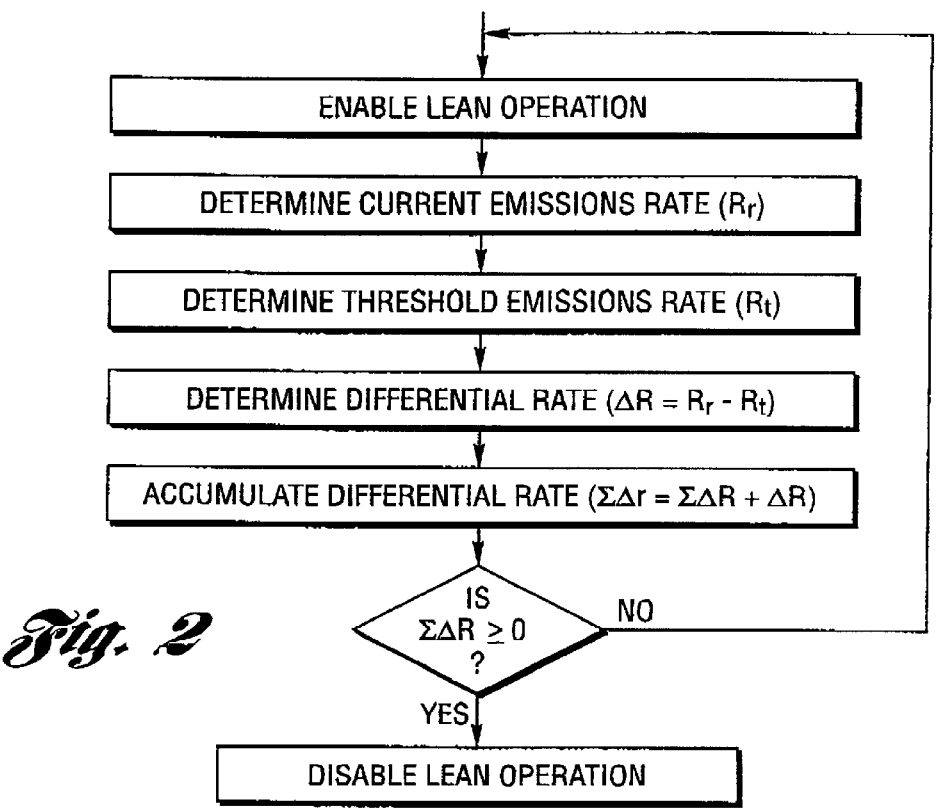
FIG. 2 a flow diagram generally illustrating the broad method steps of an exemplary method for practicing the invention.

A flow chart generally illustrating an exemplary method of practicing the invention in connection with the exemplary system 10 is illustrated in FIG. 2. Upon initialization, which typically occurs no later than the commencement of a trap purge event, the controller 14 resets a run timer used to track a first time period, and adjusts the output of the fuel injectors 16 to thereby achieve a lean air-fuel mixture for combustion within each cylinder 18. The controller 14 then samples the output signal generated by the $NO_x$ sensor 40 to obtain a current rate $R_c$ for vehicle $NO_x$ emissions.

The controller 14 also determines a threshold rate $R_t$ for permissible vehicle $NO_x$ emissions based on at least one of the group consisting of an engine speed N, a vehicle speed VS, an engine brake torque Tq, an engine manifold air pressure MAP, and a throttle position. In accordance with the invention, the threshold rate $R_t$ preferably characterizes permissible vehicle $NO_x$ emissions in terms of a gross vehicle output and/or another basic input to $NO_x$ generation, for example, as may be defined as a function of engine speed N and engine brake torque Tq, or of engine speed in combination with another measure of engine load (e.g., engine manifold air pressure MAP or throttle position), such that the threshold rate $R_t$ increases to permit greater $NO_x$ emissions with increasing gross vehicle outputs. Characterization of the threshold rate $R_t$ in terms of a gross vehicle output is preferred because such a determination inherently considers secondary inputs to $NO_x$ generation, including but not limited to variations in grade and barometric pressure, use of vehicle accessories, and trailering.

The invention also contemplates use of any suitable approximation for gross vehicle output in the determination of the threshold rate $R_t$. Thus, in the exemplary method illustrated in FIG. 2, the controller 14 calculates the threshold rate $R_t$ as a function of instantaneous vehicle speed VS, with a minimum threshold rate $R_{tMIN}$ established when the vehicle speed VS falls below a minimum value $VS_{MIN}$. A calibratable factor is also preferably used, for example, to allow for an increase in the determined threshold rate $R_t$ in the event that increased $NO_x$ emissions are permitted due to a correlative reduction in other regulated emissions, e.g., in vehicle $CO_2$ emissions.

Figure 3:
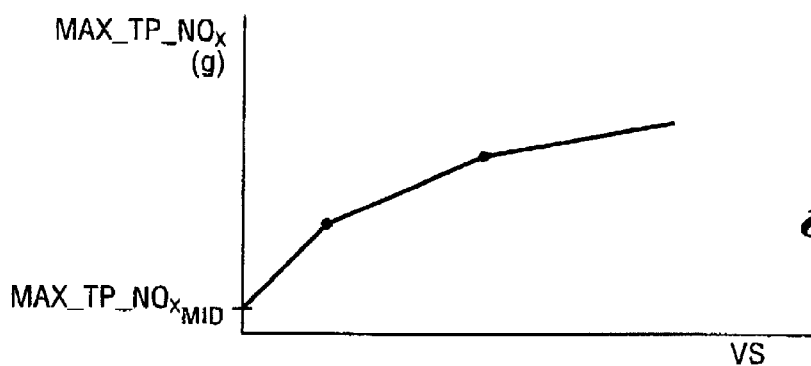
FIG. 3 is a plot generally illustrating an alternative tailpipe $NO_x$ threshold, calculated using a series of ordered pairs as a function of vehicle speed.
Figure 5:
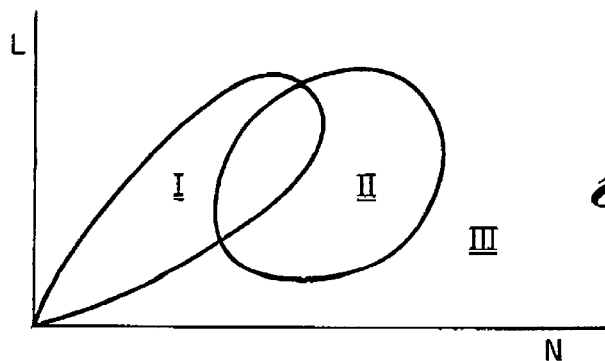
FIG. 5 is a plot of engine load versus engine speed illustrating regions of engine operating conditions falling within and without certain FTP test cycles.

While the invention contemplates implementing the determination of the threshold rate $R_t$ in any suitable manner, for example, through real-time estimation or through the use of modeled values stored in a ROM look-up table, in the exemplary system 10, the controller 14 calculates the threshold rate $R_t$ as a function of instantaneous vehicle speed using a piecewise linearized function of "n" ordered pairs, as illustrated in FIG. 3.

In accordance with another feature of the invention, the controller 14 determines a differential rate $\Delta R$ for vehicle $NO_x$ emissions by subtracting the threshold rate $R_t$ from the current rate $R_c$. The differential rate $\Delta R$ represents the rate at which current $NO_x$ emissions exceed the permissible $NO_x$ emissions, as determined from the current gross vehicle output. A negative value indicates relatively "clean" vehicle operation, with current $NO_x$ emissions less than the determined permissible $NO_x$ emissions. A positive value for the differential rate $\Delta R$ indicates that current $NO_x$ emissions exceed the determined permissible $NO_x$ emissions.

In accordance with another feature of the invention, the controller 14 accumulates the differential rate $\Delta R$ during the first time period to obtain a differential measure $\Sigma \Delta R$ representing the amount by which current $NO_x$ emissions have fallen below the determined permissible $NO_x$ emissions. Thus, the differential measure $\Sigma \Delta R$ provides a running total of the $NO_x$-emissions "cushion" achieved during the first time period. And, because $NO_x$ emissions cushions nearly always occur during a trap purge event (except under extremely high-speed/high-load engine operating conditions) and usually continue during the initial portion of a subsequent lean operating excursion (because of the trap's renewed storage efficiency), the invention permits the $NO_x$ emissions cushions to be "banked" to later offset excessive $NO_x$ emissions experienced during the latter portion of the first time period (when the trap operates with a reduced storage efficiency).

The controller 14 thereafter selects an engine operating condition based on the differential rate, for example, by comparing the differential measure $\Sigma \Delta R$ to a near-zero threshold value, and discontinuing or disabling lean engine operation when the differential measure $\Sigma \Delta R$ exceeds the near-zero threshold value. It will be appreciated that, by discontinuing or disabling lean engine operation, it is meant that the controller 14 selects a suitable engine operating condition from either a near-stoichiometric operating region or a rich engine operating region, rather than from a lean engine operating region.

Figure 4A:
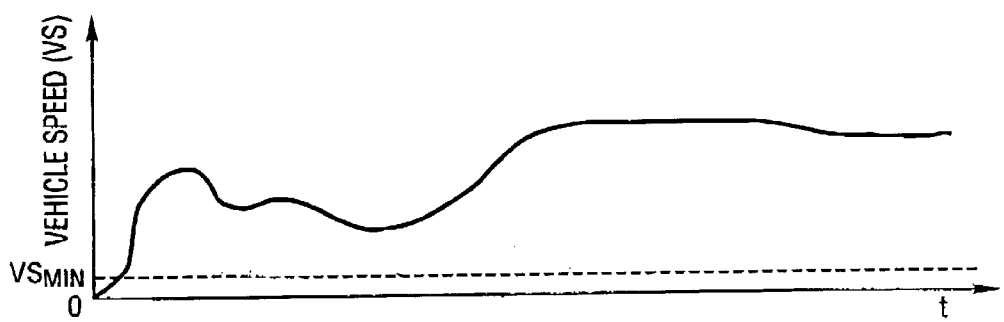
FIGS. 4A–4D are a collection of related plots respectively illustrating vehicle speed VS versus time, intake air-fuel ratio λ versus time, current and threshold $NO_x$ emissions rates versus time, and the differential measure versus time.
Figure 4B:
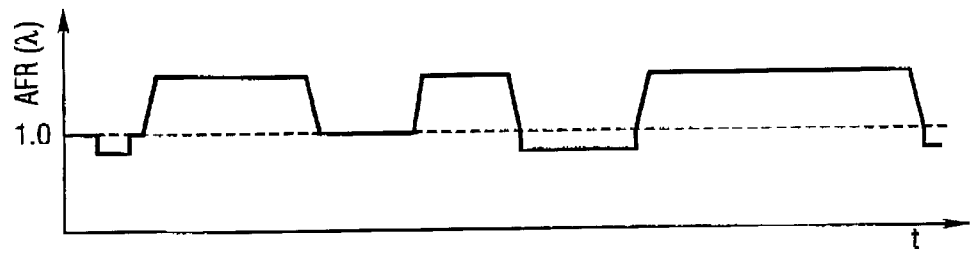
Figure 4C:
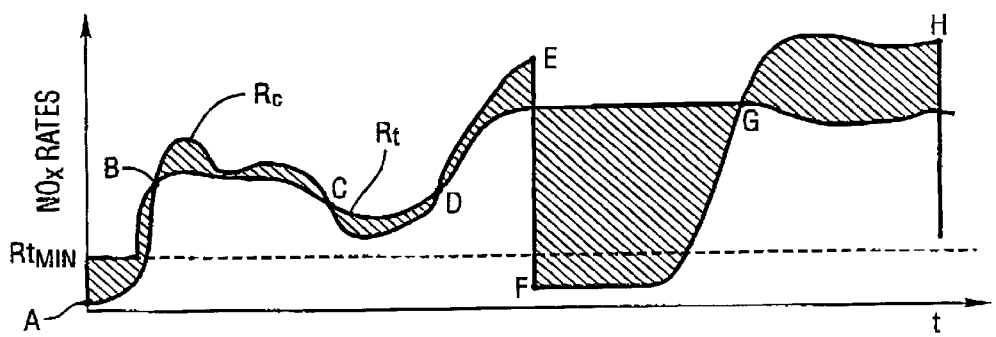
Figure 4D:
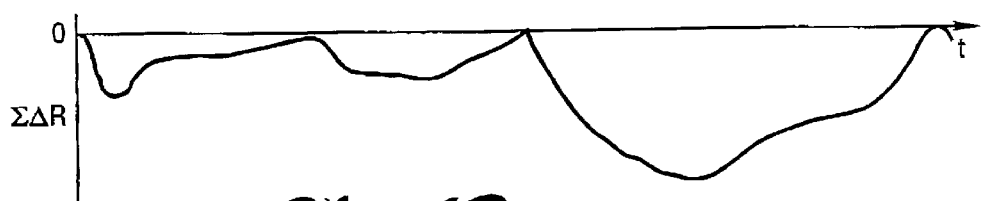

FIGS. 4A–4D are a collection of related plots respectively illustrating vehicle speed VS versus time, intake air-fuel ratio λ versus time, and the $NO_x$ emissions rates versus time, for two respective cycles as a theoretical vehicle is accelerated from a stop, through several vehicle speed changes, through a first "highway cruise" speed and, ultimately, to a second highway cruise speed. The relatively mild, near-stoichiometric acceleration beginning at point A of FIG. 4C produces current rates $R_c$ of tailpipe $NO_x$ emissions which are significantly less than the minimum threshold rate $R_{tMIN}$. As the rate of acceleration is increased, the controller 14 temporarily enriches the air-fuel mixture supplied to each cylinder 18 in a known manner, thereby resulting again in relatively low levels of tailpipe $NO_x$. Because, in the exemplary embodiment, the threshold rate $R_t$ is conveniently calculated as a function of vehicle speed VS, the instantaneous $NO_x$ emissions cushion increases, with "banked" cushions being represented by an increasingly negative accumulated value for the differential measure $\Sigma \Delta R$, as seen in FIG. 4D.

As the rate of acceleration begins to rapidly decline, the controller 14 transitions through a near-stoichiometric operating condition to a first lean operating condition (beginning at point B of FIG. 4C). Because of the relatively high vehicle speed and, correlatively, the relatively high air mass flow through the engine 12, and with the trap 36 slowly being filled with stored $NO_x$, the current rates $R_c$ for vehicle $NO_x$ emissions during the first lean operating condition ultimately begin to exceed the corresponding threshold rates $R_t$ and the banked $NO_x$ emissions cushion represented by the differential measure $\Sigma \Delta R$ begins to fall slightly. At point C, the vehicle undergoes brisk deceleration, and the controller 14 temporarily "breaks out" of the first lean operating condition in a known manner in order to prevent engine roughness. At point D, the vehicle begins to slowly accelerate up to a "highway cruise" speed, and the controller 14 alters the air-fuel mixture supplied to each cylinder 18 to continue the first lean operating condition.

The current rates $R_c$ for vehicle $NO_x$ emissions quickly rise in excess of the respective threshold rates $R_t$, with the resulting excess tailpipe $NO_x$ emissions ultimately reducing the differential measure $\Sigma \Delta R$ to a near-zero value at point E of FIG. 4C.

Because continued lean engine operation beyond point E of FIG. 4C would result in a cumulative excess of vehicle $NO_x$ emissions, the controller 14 discontinues or disables lean engine operation in favor of a near-stoichiometric operating condition or, more preferably as seen in FIG. 4B, a rich operating condition suitable for purging the trap of stored $NO_x$. The run timer is also preferably reset by the controller 14 upon commencement of the purge event. As seen in FIG. 4D, the extremely low vehicle $NO_x$ emissions incident to the trap purge event quickly restores the accumulated $NO_x$ emissions cushion (represented by a high negative value for the differential measure $\Sigma \Delta R$). When the trap is purged of stored $NO_x$, the controller 14 enables lean engine operation, as indicated at point F on FIG. 4C. The trap slowly fills with stored $NO_x$, whereupon the current rates $R_c$ for $NO_x$ emissions again slowly climb until the current rates $R_c$ exceed the respective threshold rates $R_t$ at point G of FIG. 4C. The resulting excess tailpipe $NO_x$ emissions again ultimately reduce the differential measure $\Sigma \Delta R$ to a near-zero value at point H of FIG. 4C, whereupon the controller 14 discontinues the second lean operating condition in favor of a second trap purge event.

In accordance with another feature of the invention, the controller 14 determines a generation rate $R_g$ at which the engine 12 generates $NO_x$, and calculates a trap storage rate $R_s$ based on the difference between the generation rate and the current rate $R_c$, preferably using a suitable delay to accommodate time lag introduced by the exhaust gas purification system 32. The controller 14 discontinues lean engine operation when an accumulated measure $\Sigma R_s$ based on the trap storage rate $R_s$ exceeds a trap capacity value, which may itself be determined in real time by the controller 14 as a function of at least one of the group consisting of a trap temperature, a trap sulfation level, and an air-fuel ratio.

Significantly, if the controller 14 discontinues lean engine operation based upon the trap storage measure $\Sigma R_s$ while the differential measure $\Sigma \Delta R$ continues to register a $NO_x$ emissions cushion, the controller 14 may, where appropriate, temporarily delay the trap purge event in favor of near-stoichiometric engine operation, until such time as the differential measure $\Sigma \Delta R$ is again reduced to the near-zero threshold value therefor. Conversely, if the controller 14 discontinues lean engine operation based on the differential rate $\Delta R$ when the trap is not otherwise filled with stored $NO_x$ (as may occur when operating the engine at extremely high-engine-speed/high-engine-load combinations), the trap storage measure $\Sigma R_s$ is preferably used in an open-loop calculation of the purge time to be used in the ensuing trap purge event.

While the best mode for carrying out the invention has been described in detail, those familiar with the art to which this invention relates will recognize various alternative designs and embodiments for practicing the invention within the scope of the appended claims.

What is claimed is:

1. A method for controlling the operation of an internal combustion engine in a motor vehicle, wherein the engine generates exhaust gas including $NO_x$, and wherein exhaust gas is directed through an exhaust gas purification system including a $NO_x$ trap before being exhausted to the atmosphere, the method comprising:

determining a current rate at which $NO_x$ is being exhausted to the atmosphere;

determining a threshold rate representing a maximum instantaneous rate at which $NO_x$ is permitted to be exhausted to the atmosphere, the threshold rate being based on at least one of the group consisting of an engine speed, a vehicle speed, an engine brake torque, an engine manifold air pressure, and a throttle position;

determining a differential rate based on the current rate and the threshold rate; and selecting a restricted range of engine operating conditions based on the differential rate, wherein the restricted range of engine operating conditions is characterized by a plurality of air-fuel ratios, each of the plurality of air-fuel ratios being not leaner than a near-stoichiometric air-fuel ratio.

2. The method of claim 1, wherein determining the current rate includes sampling an output signal generated by a $NO_x$ sensor positioned in the exhaust system downstream of the trap.

3. The method of claim 1, wherein determining the current exhaust rate includes:

determining a generation rate representative of the $NO_x$ content of the exhaust being instantaneously generated by the engine; and determining a storage rate representative of an instantaneous rate at which $NO_x$ is being stored by the trap.

4. The method of claim 1, wherein the threshold rate is a function of an instantaneous value of at least one of the group consisting of the engine speed, the vehicle speed, the engine brake torque, the engine manifold air pressure, and the throttle position.

5. The method of claim 4, wherein the threshold rate is modified by a calibratable factor.

6. A method for controlling the operation of an internal combustion engine in a motor vehicle, wherein the engine generates exhaust gas including $NO_x$, and wherein exhaust gas is directed through an exhaust gas purification system including a $NO_x$ trap before being exhausted to the atmosphere, the method comprising:

determining a current rate at which $NO_x$ is being exhausted to the atmosphere;

determining a threshold rate representing a maximum instantaneous rate at which $NO_x$ is permitted to be exhausted to the atmosphere, the threshold rate being based on at least one of the group consisting of an engine speed, a vehicle speed, an engine brake torque, an engine manifold air pressure, and a throttle position;

determining a differential rate based on the current rate and the threshold rate; and selecting a restricted range of engine operating conditions based on the differential rate, wherein the restricted range of engine operating conditions is characterized by a plurality of air-fuel ratios, each of the plurality of air-fuel ratios being not leaner than a near-stoichiometric air-fuel ratio, and wherein selecting includes:

accumulating the differential rate over a first time period to obtain a differential measure; and comparing the differential measure to an excess $NO_x$ emissions value.

7. The method of claim 6, wherein the excess $NO_x$ emissions value is a near-zero value.

8. The method of claim 6, including resetting the first time period to zero upon selecting an engine operating condition within the first range of engine operating conditions characterized by an air-fuel ratio that is rich of the stoichiometric air-fuel ratio.

9. The method of claim 8, further including:

calculating a cumulative amount of $NO_x$ stored in the trap using the current rate; and selecting the first region of engine operating conditions when the cumulative amount exceeds a trap capacity value.

10. The method of claim 9, including determining the trap capacity value as a function of at least one of the group consisting of a trap temperature, a trap sulfation level, and an air-fuel ratio.

11. A method for controlling the $NO_x$ emissions of a motor vehicle, wherein the vehicle is powered by an internal combustion engine capable of lean engine operation, wherein the engine generates exhaust gas including $NO_x$, and wherein exhaust gas is directed through a three-way catalyst and a $NO_x$ trap before being exhausted to the atmosphere, the method comprising:

determining a current vehicle $NO_x$ emissions rate;

determining a threshold rate for vehicle $NO_x$ emissions based on at least one of the group consisting of an engine speed, a vehicle speed, an engine brake torque, an engine manifold air pressure, and a throttle position;

determining a differential rate based on the difference between the current rate and the threshold rate;

accumulating the differential rate over a first time period to obtain a differential measure; and disabling lean engine operation when the differential measure exceeds an excess $NO_x$ emissions value.

12. The method of claim 11, wherein determining the current rate includes sampling an output signal generated by a $NO_x$ sensor positioned in the exhaust system downstream of the trap.

13. The method of claim 11, wherein determining the current rate includes:

determining a generation rate representative of the $NO_x$ content of the exhaust being instantaneously generated by the engine; and determining a storage rate representative of an instantaneous rate at which $NO_x$ is being stored by the trap.

14. The method of claim 11, wherein the threshold rate is a function of an instantaneous value of at least one of the group consisting of the engine speed, the vehicle speed, the engine brake torque, the engine manifold air pressure, and the throttle position.

15. The method of claim 14, wherein the threshold rate is modified by a calibratable factor.

16. The method of claim 11, including determining the total $NO_x$ emissions value as a function of at least one of the group consisting of the engine speed, the vehicle speed, the engine brake torque, the engine manifold air pressure, and the throttle position.

17. The method of claim 11, further including:

determining a storage measure representing a cumulative amount of $NO_x$ stored by the trap during the first time period based on the current rate and the threshold rate; and disabling lean engine operation when the differential measure exceeds a trap capacity value.

18. The method of claim 17, wherein the trap capacity value is determined as a function of at least one of the group consisting of a trap temperature, a trap sulfation level, and an air-fuel ratio.

19. A system for controlling the operation of a lean-burn internal combustion engine, the exhaust gas from the engine being directed through an exhaust gas purification system including a $NO_x$ trap before being exhausted to the atmosphere, the system comprising:

a controller including a microprocessor arranged to determine a current rate at which $NO_x$ is being exhausted to the atmosphere, wherein the controller is further arranged to determine a threshold rate representing a maximum instantaneous rate at which $NO_x$ is permitted to be exhausted to the atmosphere, the threshold rate being based on at least one of the group consisting of an engine speed, a vehicle speed, an engine brake torque, an engine manifold air pressure, and a throttle position; to determine a differential rate based on the current rate and the threshold rate; and to select a restricted range of engine operating conditions based on the differential rate, wherein the restricted range of engine operating conditions is characterized by a plurality of air-fuel ratios, each of the plurality of air-fuel ratios being not leaner than a near-stoichiometric air-fuel ratio.

20. The system of claim 19, further including a $NO_x$ sensor positioned in the exhaust system downstream of the trap, the $NO_x$ sensor generating an output signal representative of an instantaneous concentration of $NO_x$ in the exhaust gas, and wherein the controller is further arranged to determine the current rate by sampling the output signal generated by the $NO_x$ sensor.

21. The system of claim 19, wherein the controller is further arranged to determine a generation rate representative of the $NO_x$ content of the exhaust being instantaneously generated by the engine, and to determine a storage rate representative of an instantaneous rate at which $NO_x$ is being stored by the trap.

22. The system of claim 19, wherein the controller is further arranged to determine the threshold rate as a function of an instantaneous value of at least one of the group consisting of the engine speed, the vehicle speed, the engine brake torque, the engine manifold air pressure, and the throttle position.

23. The system of claim 22, wherein the controller is further arranged to determine modify the threshold rate by a calibratable factor.

24. A system for controlling the operation of a lean-burn internal combustion engine, the exhaust gas from the engine being directed through an exhaust gas purification system including a $NO_x$ trap before being exhausted to the atmosphere, the system comprising:

a controller including a microprocessor arranged to determine a current rate at which $NO_x$ is being exhausted to the atmosphere, wherein the controller is further arranged to determine a threshold rate representing a maximum instantaneous rate at which $NO_x$ is permitted to be exhausted to the atmosphere, the threshold rate being based on at least one of the group consisting of an engine speed, a vehicle speed, an engine brake torque, an engine manifold air pressure, and a throttle position; to determine a differential rate based on the current rate and the threshold rate; and to select a restricted range of engine operating conditions based on the differential rate, wherein the restricted range of engine operating conditions is characterized by a plurality of air-fuel ratios, each of the plurality of air-fuel ratios being not leaner than a near-stoichiometric air-fuel ratio, wherein the controller is further arranged to accumulate the differential rate over a first time period to obtain a differential measure, and compare the differential measure to an excess $NO_x$ emissions value.

25. The system of claim 24, wherein the excess $NO_x$ emissions value is a near-zero value.

26. The system of claim 24, wherein the controller is further arranged to reset the first time period to zero upon selecting an engine operating condition within the first range of engine operating conditions characterized by an air-fuel ratio that is rich of the stoichiometric air-fuel ratio.

27. The system of claim 19, wherein the controller is further arranged to calculate a cumulative amount of $NO_x$ stored in the trap using the current rate, and to select the first region of engine operating conditions when the cumulative amount exceeds a trap capacity value.

28. The system of claim 27, wherein the controller is further arranged to determine the trap capacity value as a function of at least one of the group consisting of a trap temperature, a trap sulfation level, and an air-fuel ratio.

* * * * *